(12) United States Patent
Petrofsky et al.

(10) Patent No.: US 8,741,369 B2
(45) Date of Patent: Jun. 3, 2014

(54) MICROWAVEABLE DOUGH COMPOSITIONS

(75) Inventors: Keith E. Petrofsky, Round Lake, IL (US); Steven P. Greiner, Mundelein, IL (US); Amy L. Matusheski, Gurnee, IL (US); Uraiwan Tangprasertchai, Inverness, IL (US); Samira Mirarefi, Chicago, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 1157 days.

(21) Appl. No.: 11/085,696

(22) Filed: Mar. 21, 2005

(65) Prior Publication Data
US 2006/0210673 A1    Sep. 21, 2006

(51) Int. Cl.
*A21D 10/00* (2006.01)

(52) U.S. Cl.
USPC ........... 426/549; 426/237; 426/241; 426/243; 426/496

(58) Field of Classification Search
USPC .......................... 426/549, 237, 241, 243, 496
See application file for complete search history.

(56) References Cited

U.S. PATENT DOCUMENTS

| | | | |
|---|---|---|---|
| 3,023,104 A | 2/1962 | Battista et al. | |
| 3,876,794 A | 4/1975 | Rennhard | |
| 4,015,085 A | 3/1977 | Woods | |
| 4,034,125 A | 7/1977 | Ziemke et al. | |
| 4,042,714 A | 8/1977 | Torres | |
| 4,207,348 A | 6/1980 | Vermilyea et al. | |
| 4,456,625 A | 6/1984 | Durst | |
| 4,461,782 A | 7/1984 | Robbins et al. | |
| 4,511,585 A | 4/1985 | Durst | |
| 4,582,711 A | 4/1986 | Durst | |
| 4,590,076 A | 5/1986 | Titcomb et al. | |
| 4,668,519 A | 5/1987 | Dartey et al. | |
| 4,721,622 A | 1/1988 | Kingham et al. | |
| 4,735,811 A | 4/1988 | Skarra et al. | |
| 4,857,353 A | 8/1989 | Jackson | |
| 4,885,180 A | 12/1989 | Cochran et al. | |
| 5,008,254 A | 4/1991 | Weibel | |
| 5,035,904 A | 7/1991 | Huang et al. | |
| 5,049,398 A | 9/1991 | Saari et al. | |
| 5,106,644 A | 4/1992 | El-Nokaly | |
| 5,110,614 A | 5/1992 | Corbin et al. | |
| 5,164,216 A | 11/1992 | Engelbrecht et al. | |
| 5,260,076 A | 11/1993 | Furcsik et al. | |
| 5,266,345 A | 11/1993 | Corbin et al. | |
| 5,281,584 A | 1/1994 | Tobey | |
| 5,409,717 A | 4/1995 | Apicella et al. | |
| 5,416,305 A | 5/1995 | Tambellini | |
| 5,480,669 A | 1/1996 | Zallie et al. | |
| 5,766,638 A | 6/1998 | Tobey | |
| 5,846,585 A | 12/1998 | Ohmura et al. | |
| 5,976,598 A | 11/1999 | Akkaway et al. | |
| 6,001,399 A | 12/1999 | Kilibwa | |
| 6,048,558 A | 4/2000 | Feldmeier et al. | |
| 6,068,863 A | 5/2000 | Dupart et al. | |
| 6,083,550 A | 7/2000 | Cochran et al. | |
| 6,123,975 A | 9/2000 | Ohlin et al. | |
| 6,168,812 B1 | 1/2001 | Paulucci | |
| 6,210,723 B1 | 4/2001 | Coleman et al. | |
| 6,251,458 B1 | 6/2001 | Weibel | |
| 6,406,723 B1 | 6/2002 | Soe et al. | |
| 6,503,546 B1 | 1/2003 | Ferrari-Philippe et al. | |
| 6,579,546 B1 | 6/2003 | Jahnke | |
| 6,579,554 B2 | 6/2003 | Moder et al. | |
| 6,589,583 B1 | 7/2003 | Hansen et al. | |
| 6,620,450 B1 | 9/2003 | Davis et al. | |
| 6,623,777 B2 | 9/2003 | Kawase et al. | |
| 6,627,242 B1 | 9/2003 | McPherson et al. | |
| 6,660,311 B2 * | 12/2003 | Goedeken et al. | 426/27 |
| 6,706,305 B2 | 3/2004 | Wolt et al. | |
| 6,753,026 B2 | 6/2004 | Kortum | |
| 6,764,700 B2 | 7/2004 | Lamp et al. | |
| 6,803,067 B2 | 10/2004 | Braginsky et al. | |
| 6,881,429 B2 | 4/2005 | Geng et al. | |
| 6,919,097 B2 | 7/2005 | Lamp et al. | |
| 7,014,878 B2 | 3/2006 | Tangprasertchai et al. | |
| 2002/0039612 A1 | 4/2002 | Gambino et al. | |
| 2002/0064586 A1 | 5/2002 | McPherson et al. | |
| 2002/0136814 A1 | 9/2002 | Forneck et al. | |
| 2002/0146490 A1 | 10/2002 | Lamp et al. | |
| 2002/0172747 A1 | 11/2002 | Brodie et al. | |
| 2002/0197360 A1 | 12/2002 | Lamp et al. | |
| 2003/0077356 A1 | 4/2003 | Campbell et al. | |

(Continued)

FOREIGN PATENT DOCUMENTS

| | | |
|---|---|---|
| EP | 0 727 143 A1 | 8/1996 |
| EP | 0748589 | 12/1996 |

(Continued)

OTHER PUBLICATIONS

Robert S. Igoe. "Dictionary of Food Ingredients." 4th Edition, Aspen Publishers, 2001, pp. 83, 90, 156.
C. Ortolá et al., "Almacenamiento del pan envasado. I. Efectos de la reducción de la actividad de agua y control de la contaminación microbiana sobre las caracteristicas del pan" Rev. Agroquim. Tecnol. Aliment., vol. 23, No. 3 (1989), pp. 384-398.
Barbara M. Lund et al., The Microbiological Safety and Quality of Food, 2000, Aspen Publishers, vol. I-II, p. 774 (4 pages).
Pre-Filing Search Containing Patent and Non-Patent Literature related documents, undated (22 pages).
K.D. Nishita et al., "Development of a Yeast-Leavened Rice-Bread Formula." Cereal Chemistry, vol. 53, No. 5, 1976, pp. 626-635.

(Continued)

*Primary Examiner* — Lien T Tran
(74) *Attorney, Agent, or Firm* — Fitch, Even, Tabin & Flannery LLP (57) ABSTRACT

Microwavable dough compositions are provided that are effective for providing products with improved texture using microwave heating. More specifically, the microwavable dough compositions include a blend of fiber, hydrocolloid, methylcellulose and functional surfactants in amounts that are effective for providing a cooked dough having improved firmness for an extended time after microwave cooking.

29 Claims, 3 Drawing Sheets

(56) References Cited

U.S. PATENT DOCUMENTS

| | | |
|---|---|---|
| 2003/0082287 A1 | 5/2003 | Wolt et al. |
| 2003/0190398 A1 | 10/2003 | Reuter et al. |
| 2003/0203076 A1 | 10/2003 | Watanabe et al. |
| 2003/0203091 A1 | 10/2003 | Hayes-Jacobson |
| 2003/0206994 A1 | 11/2003 | Jahnke |
| 2004/0013781 A1 | 1/2004 | Tangprasertchai et al. |
| 2004/0028782 A1 | 2/2004 | Jahnke |
| 2004/0028790 A1 | 2/2004 | Kawase et al. |
| 2004/0213883 A1 | 10/2004 | Sadek et al. |
| 2004/0219271 A1 | 11/2004 | Belknap et al. |
| 2004/0234663 A1 | 11/2004 | Motoi et al. |
| 2004/0241303 A1 | 12/2004 | Levin et al. |
| 2005/0031754 A1 | 2/2005 | Maningat et al. |
| 2005/0048182 A1 | 3/2005 | King et al. |
| 2005/0129823 A1 | 6/2005 | Dohl et al. |
| 2005/0175738 A1 | 8/2005 | Howard et al. |
| 2005/0202126 A1 | 9/2005 | Zhang et al. |
| 2005/0226962 A1 | 10/2005 | Howard et al. |
| 2005/0276896 A1 | 12/2005 | Sadek et al. |
| 2007/0054024 A1* | 3/2007 | De Man et al. ............... 426/549 |
| 2008/0063758 A1 | 3/2008 | Kwiat et al. |
| 2010/0215825 A1 | 8/2010 | Boursier et al. |

FOREIGN PATENT DOCUMENTS

| | | |
|---|---|---|
| EP | 0776604 | 6/1997 |
| EP | 0788743 | 8/1997 |
| EP | 0 806 145 A | 11/1997 |
| EP | 1 008 309 A1 | 6/2000 |
| EP | 1 053 681 A2 | 11/2000 |
| EP | 1 053 682 A2 | 11/2000 |
| EP | 1181868 | 2/2002 |
| EP | 1238588 | 9/2002 |
| EP | 1 291 298 A2 | 3/2003 |
| EP | 1 433 383 A1 | 6/2004 |
| GB | 961 398 A | 6/1964 |
| GB | 1 062 423 A | 3/1967 |
| GB | 1 242 350 A | 8/1971 |
| GB | 1 264 529 A | 2/1972 |
| JP | 7111855 A | 5/1995 |
| JP | 7289144 A | 11/1995 |
| JP | 7289145 A | 11/1995 |
| JP | 8173013 A | 7/1996 |
| JP | 11009173 A | 1/1999 |
| WO | 93/03979 A1 | 3/1993 |
| WO | WO 95/07025 | 3/1995 |
| WO | WO 96/11577 | 4/1996 |
| WO | 99/08553 A1 | 2/1999 |
| WO | 99/15021 A1 | 4/1999 |
| WO | WO 99/37158 | 7/1999 |
| WO | WO 99/44428 | 9/1999 |
| WO | 03/067992 A1 | 8/2003 |
| WO | WO 03/079798 | 10/2003 |
| WO | WO 03/092388 | 11/2003 |
| WO | 2005/023007 A1 | 3/2005 |

OTHER PUBLICATIONS

R. Sharadanant et al., "Effect of Hydrophilic Gums on Frozen Dough. I. Dough Quality." Cereal Chemistry, vol. 80, No. 6, 2003, pp. 764-772.

* cited by examiner

MICROWAVEABLE DOUGH COMPOSITIONS

The present invention is directed to microwavable dough compositions that are effective for providing products with improved texture using microwave heating. More specifically, the microwavable dough compositions include a blend of fiber, hydrocolloid, methylcellulose and functional surfactants in amounts that are effective for providing a cooked dough having improved firmness for an extended time after microwave cooking.

BACKGROUND

There has been a large expansion in the number of microwave foods available on the market. In the area of bread-like foods, little improvement in textural attributes has been made in commercially available microwavable products. Bread products that are heated in a microwave oven may exhibit excessive toughening and firming. The outer crust layer may become so tough that it is difficult to tear such a product. The inner crumb may become very difficult to chew. Also, the textural quality can deteriorate much faster than that of a conventional oven baked product during the course of cooling. Overcooking in a microwave oven may exacerbate the problem while a reduction in overall cooking or reheating may reduce toughness and firmness.

Frozen, bake at home bread products have been developed over the years. These products were initially expressly developed for baking in thermal ovens and could not be cooked in microwave ovens. Further, some frozen crusts have been made available for pizza manufacture but have been formulated and designed solely for cooking in thermal ovens. While these products have had some success in the marketplace, a strong desire has existed for many years for microwaveable dough products that cook in a microwave oven to a fully acceptable form equivalent to that made by conventional baking processes.

The vast majority of frozen pizzas designed for microwave energy heating have comprised foods made by forming a topping on a pre-baked crust. Such foods are typically configured for reheating in a microwave oven such that the partially baked (par-baked) crust is returned to a semblance of the baked crust as it was freshly made prior to freezing. Such a par-baked, ready to heat and eat crusts are well known and have been available for many years. These foods, when reheated, do not substantially change in the nature of the size or thickness of the crust, do not obtain any substantial chemical or yeast driven leavening of the crust, typically do not change the bready texture of the crust and do not typically result in substantial browning characteristics in the reheating of the product.

A number of attempts have been made to provide dough compositions and bread-like products that can be obtained through baking in a microwave oven. U.S. Pat. Nos. 5,035,904, 6,123,975 and U.S. Publication No. US2004/0213883, all describe dough composition that may be prepared in a microwave oven. All of these compositions tend to become drier, firmer, tougher and crumblier and have less acceptable texture, as demonstrated by expert panel or instrumentally, within a short time after cooking in a microwave oven. Hence, a need exists for dough compositions, par baked, and pre-baked products that can be prepared in a microwave oven and yield products with preferred textural qualities for an extended time after cooking.

SUMMARY

A combination of ingredients is provided that is effective for improving textural robustness of baked goods and for allowing dough/bread based products to be cooked, baked or reheated in a microwave oven and maintain an improved texture for an extended time after cooking, baking or reheating. The present ingredients are effective for preventing and reducing changes associated with post-cooking texture to maintain a softer, moister, and more cohesive product. The ingredients combine the functionality of fiber, hydrocolloid, and methylcellulose to control moisture loss and migration, improve softening, reduce finning, and increase eating lubricity. The combination of these ingredients with functional surfactants improves texture tenderness and reduces firmness in microwavable baked goods.

A microwavable dough or baked good includes fiber, hydrocolloid, methylcellulose, and functional surfactant in amounts effective to provide a cooked dough having a firmness of 2000 grams of force or less at 15 minutes after microwaving as determined using a TA.XT2 Texture analyzer as described herein. This combination of ingredients is effective for reducing post-cooking or heating aging related changes that cause dryness, crumbliness, and firmness increases in dough and bread based goods.

In one aspect, the dough includes from about 0.05 weight percent to about 20 weight percent fiber, preferably about 0.1 to about 10 weight percent fiber, more preferably about 0.2 to about 5 weight percent fiber, and most preferably about 1.8 to about 5.0 weight percent fiber, based on the weight of the dough. The amount of fiber used will vary depending on the fiber source, treatment to the fiber to modify moisture holding capability, and particle size. In this aspect, fiber may be provided from wheat fiber, corn fiber, barley fiber, rye fiber, oat fiber, cellulose powder, sugar beet fiber, inulin, and mixtures thereof. The fiber will have a water holding capacity (WHC) of at least about 100% (1× it's weight based on a modification of AACC method 56.2 (Watson Analytical Procedure for Fiber Hydration WAP-92582) for water holding capacity. More preferably, the fiber will have a WHC>200% and most preferably >400%.

The dough composition further includes about 0.01 weight percent to about 5 weight percent hydrocolloid, more preferably about 0.05 weight percent to about 2.5 weight percent hydrocolloid, and most preferably about 0.1 weight percent to about 1 weight percent hydrocolloid, based on the weight of the dough. The amount of hydrocolloid used depends on the type of hydrocolloid, it's ability to control water, and it's viscosity characteristics. Hydrocolloids may include ionic gums, neutral gums, modified starches, and mixtures thereof. Hydrocolloids particularly useful in the present invention include, for example, xanthan gum, guar gum, Konjac gum, pectin, carageenan, derivatives of these compounds, and mixtures thereof.

In another aspect, the dough also includes about 0.05 weight percent to about 20 weight percent methylcellulose, more preferably about 0.1 weight percent to about 10 weight percent methylcellulose, and most preferably about 0.2 weight percent to about 5 weight percent methylcellulose. The amount of methylcellulose used depends on the type of methylcellulose, it's viscosity, and it's hot gel formation temperature. Stronger gels typically have lower hydration temperatures and lower incipient gel temperatures. Additional ingredients including sugars, salts, and alcohols can modify the gel temperatures of methylcellulose gums. Methylcellulose compounds that may be used include methylcellulose, hydroxypropylmethylcellulose, carboxymethylcellulose, ethylcellulose, and mixtures thereof. Methylcellulose compounds useful in the present invention include commercially available methylcellulose preparations such as Methocel (Dow) and hydroxylmethylcellulose. Methylcellulose used in the dough will have a viscosity of about 10 to about 10,000 mPa·s (viscosity of a 2% aqueous solution at 68° F.) and a hot gel formation temperature range of about 90° F. to 200° F., more preferably having a viscosity of about 15 to about 5000 mPa·s and a hot gel formation temperature range of about 90° F. to 170° F.

The dough composition also includes about 0.05 weight percent to 20 weight percent functional surfactant, more preferably 0.1 weight percent to about 10 weight percent functional surfactant, and most preferably 0.2 weight percent to about 5 weight percent functional surfactant. Functional surfactants useful in the present invention include SSL (Sodium Stearoyl Lactylate, ADM Arkady), CSL (Calcium Stearoyl Lactylate, ADM Arkady), DATEM (Diacetyl Tartaric Esters of Monoglycerides, Danisco), monoglycerides, mono and diglycerides, different forms of mono and diglycerides, ethoxylated monoglycerides, succinylated monoglycerides, etc., polysorbate emulsifiers, sucrose esters, lecithin and modified lecithins, and mixtures thereof.

The formulations used in preparing the dough materials may be baked into a crust using several methods. For example, the mixed and rested dough may be sheeted, docked, cut to the appropriate form, proofed, partially frozen, frozen, topped and baked after storage. In this process, the dough, during cooking, expands substantially to form a fully baked, bready interior, but crispy crust with controlled moisture content. Moisture may be about 20 to about 40%, depending on the form. Typical pizza crust would have a moisture content of about 20 to about 30%, and a typical flatbread would have a moisture contest of about 25 to about 35%. In an alternative aspect, the dough can be blended into workable dough, formed into dough balls, pressed into a rough crust form using high temperature pressing technology, proofed or raised, frozen and topped with pizza toppings, the frozen dough can then be baked in a microwave oven.

In an important aspect, the dough compositions may be used to form a pizza crust. The dough compositions are effective for providing a frozen pizza that can be thawed, placed in a microwave oven and quickly baked into a microwave to provide a product that has a highly desirable, high quality crust having a crispy exterior, a bready interior without microwave toughening. The pizza crust formed from the dough compositions may be combined with pizza ingredients and frozen. The frozen pizza can be distributed to consumers who can then rapidly cook the frozen pizza into a baked product having a highly attractive crust that has a crispy exterior, a bready interior in the substantial absence of any microwave toughening. The crust can be alternatively cooked in a microwave with or without a susceptor or in a thermal oven or in a combination thermal microwave oven to rapidly form the desirable product.

DETAILED DESCRIPTION

The dough compositions may be used to bake products into the form of breads, rolls, pretzels and other bready products and to make other more complex products such as pies, pizzas, calzones, etc. The dough compositions may be baked in a microwave oven, with or without a susceptor, and in thermal ovens or combination microwave or thermal ovens to form a moist, bready product having a crispy exterior crust. The crispiness and tenderness of the crust and bread are characterized by its textural properties which are measured as described herein. The dough compositions can be converted into a pizza crust using sheeting or hot pressing methods, frozen and distributed for consumption. Resulting products such as frozen pies or pizzas can be thawed and baked into high quality products rapidly using microwave technology.

Pizza crust prepared from the dough compositions obtains a crisp exterior and a light bready interior with substantially no microwave toughening out of the oven, or after extended counter-top time, from the formula and the processing of the dough materials. The components of the dough composition are effective for controlling moisture content. Moisture control contributes towards obtaining a quality crust.

The tenderness, crispness and toughness of a cooked, baked crust can be measured using texture analyzer equipment. The equipment can quantify the tenderness, crispness or toughness of a crust in units of gm (grams), $\text{gm-sec}^{-1}$ (grams per second) and gm-sec (gram seconds) by an analysis of the forces exerted by a probe. Tenderness typically is a measure of the force required to penetrate the product with the machine probe, but mimics the force needed to bite through the product. Crispness is a measurement of the steepness slope of the force curve (Force Gradient in gm-sec) needed to penetrate the crust. In other words, as the crispy crust is bitten, the slope of the penetration curve is very steep, greater than 300 $\text{gm}^{-1}$ or 550 $\text{gm-sec}^{-1}$, reaches a failure point very quickly, but fails at a relatively defined level. A less crispy crust will have a less steep curve that reaches a lesser maximum. The area under the force curve (Area of Force Curve in gm-sec) of greater than 8000 gm-sec indicates toughness in a crust and suggests that a great deal of time and force would be required to chew (penetrate) such tough crust.

Figure 1:
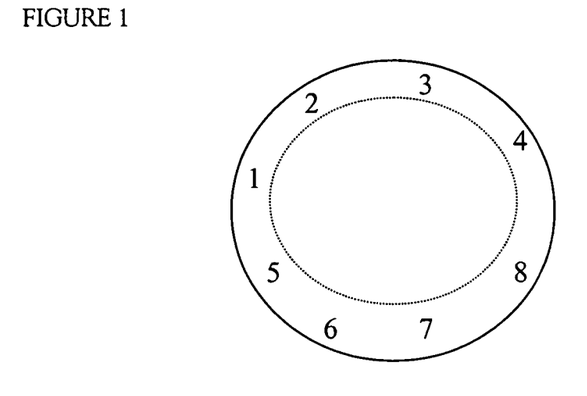
FIG. 1 illustrates sampling positions for firmness testing of dough.
Figure 2:
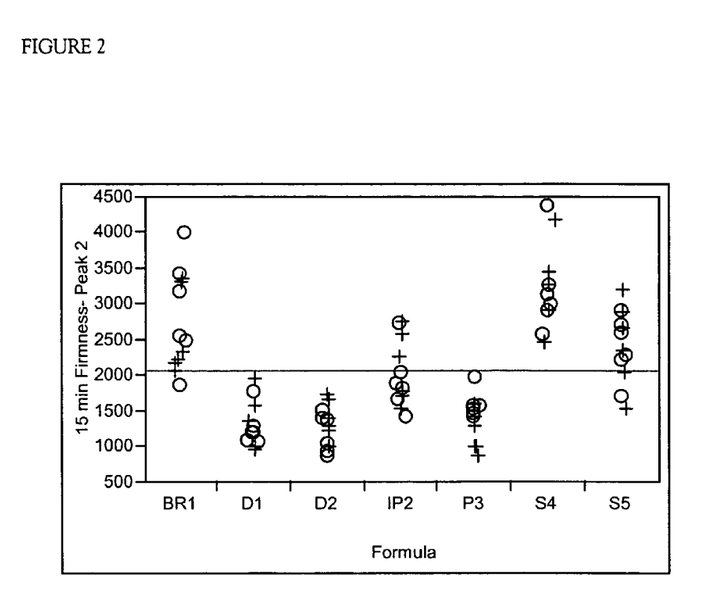
FIG. 2 illustrates the distribution of firmness measurements as a function of formula.

In measuring these crusts characteristics, the equipment is TA.XT2 Texture analyzer. The equipment can be obtained from Stable Micro System Company and is available for crust evaluations in a variety of product configurations and dough formulations. Penetration testing was conducted using a 2 mm probe at points along the rim of the microwaved dough as shown in FIG. 1.

The microwavable dough is effective to provide a cooked dough having a firmness of 2000 grams of force or less at 15 minutes after microwaving, preferably a firmness of 1800 grams of force or less at 15 minutes after microwaving, more preferably a firmness of 1600 grams of force or less at 15 minutes after microwaving, more preferably a firmness of 1400 grams of force or less at 15 minutes after microwaving, and most preferably a firmness of 1200 grams of force or less at 15 minutes after microwaving. Sampling of the dough was conducted at positions as illustrated in FIG. 1.

Fiber

Water added to form the dough hydrates the components including the protein, starch, and fiber naturally present in the flour. In baking, additional fiber is often added to increase the water holding capacity of the dough. This may be done for productivity purposes because fiber and water are less expensive than other dough ingredients, or because of a functional reason due to the improved moistness in the product from added fiber and water present. The water insoluble fibers added into the doughs of the invention are used to increase the water holding capacity of the dough. The high water holding capacity fibers allow higher dough absorptions and increase dough and baked product moisture contents. Most fibers do not trap water during cooking or heating as well as hydrocolloids or methylcellulose, but they do increase the amount of water the dough has at the start of cooking and at the end of cooking as well to improve the texture of the finished product.

The dough compositions of the invention may be formulated with a fiber or soluble fiber material which are considered to be dietary fibers. The term "dietary fiber" is commonly understood to mean that component of food which is non-digestible and non-metabolizable by humans. It is well known that dietary fibers as they occur naturally in food sources also have associated with them a digestible portion comprising fats, proteins and carbohydrates. Dietary fiber can be divided into two broad categories that include insoluble dietary fiber and water soluble dietary fiber. As used herein, "insoluble dietary fiber" means insoluble, substantially non-swellable dietary fiber. "Soluble dietary fiber" means dietary fiber which is water soluble or water swellable. Soluble dietary fiber provides the bulking effect commonly associated with fibers.

Both dietary fiber and soluble fibers are generally based on linked carbohydrate chains that are undigestable by humans. The fibrous nature of soluble fibers ordinarily results from the degree of branching and other molecular characteristics. Fiber can be obtained from a variety of sources and can take the form of cellulosic fibers, gums, soluble fibers and other forms including polydextrose. While a wide range of dietary fiber may be useful in the invention, those which are best suited for the invention are derived from cereals. Useful cereals which may provide a source of dietary fiber include wheat, corn, barley, rye, oats, rice and mixtures thereof. Fiber may also be provided in the form of cellulose powder and from sources such as sugar beets. Fiber may also be derived from legumes such as soy or pea. Fiber may also be provided in the form or fruit or vegetable fibers such as citrus or carrot, respectively. One particularly useful source of fiber and hydrocolloid is a combination of modified wheat fiber and pectin commercially available as Ultracel (Watson Foods). A combination of some hydrocolloids offers synergistic effects such as xanthan+guar or xanthan+locust bean gum.

Insoluble fibers such as soy, citrus, cottonseed, mustard, and any seed or grain-based, cellulosic, leguminous, fruit or vegetable fiber with the correct water holding capacity may be used. Fibers can also include the group of resistant starches that have reduced caloric density. Soluble fibers may include oat fiber (Hi-sol), Fibergum P, Fibergum B, Fibersol, Fibersol 2, and mixtures thereof. Fiber may also include gum arabic which acts as a fiber and can be incorporated at high levels (up to 25%) in a dough without adding significant viscosity.

Hydrocolloid

Hydrocolloids are common additives in baked goods and work to trap water in the dough during mixing, freezing, and baking. Hydrocolloids often form irreversible gels at specific temperatures which acts functionality to prevent moisture loss and migration during microwave baking. Higher viscosities of hydrocolloid solutions and gels translate into increased water retention during baking and increased moistness and softness of baked goods texture. If the hydrocolloid viscosity or level of addition is too great, the dough can be difficult to work with and the microwaved doughs become too firm or dry. For hydrocolloids, the level of addition is used to control the effectiveness of the functionality and each ingredient will have its own optimum level for microwaving. Combinations can also be used to provide improved benefits or equal benefits at reduced cost.

Hydrocolloids useful in the present invention may be derived from a large variety of natural products such as gelatin, plant exudates, seaweeds, plant seeds, fruits, animal hides or bones, fermentation products, milk by-products, cellulose; from chemically modified celluloses; from a few totally or partially man-made products which could be classified as synthetic hydrocolloid gums, e.g. polyvinyl pyrrolidone, carbopols, ethylene oxide polymers, Gantrez AN, or from ionic or neutral gums, or from any mixtures or combinations of these gums. These hydrocolloid gums are well known to those skilled in the art. Some examples of natural hydrocolloid gums in the above categories are arabic gum, ghatti gum, karaya gum, tragacanth gum, agar, alginates, carrageenans, furcellarines, arabino galactanes, guar gum, locust bean gum, psyllium seed gum, tamarind seed gum, and xanthan gum. Some examples of chemically modified celluloses are microcrystalline cellulose (i.e. Avicel), gellan gum, gelatin, carboxymethylcellulose, methylethylcellulose and hydroxypropylcellulose. As indicated herein, one particularly useful source of fiber and hydrocolloid is a combination of modified wheat fiber and pectin commercially available as Ultracel (Watson Foods).

Methylcellulose

As used herein, methylcellulose refers to "modified cellulose" which may include, for example, methylcellulose, hydroxypropylmethylcellulose, carboxymethylcellulose, and mixtures thereof. Methylcellulose is a specific type of hydrocolloid that is also able to retain moisture, thereby contributing to softness. One source of methylcellulose is available from Methocel from Dow Chemical U.S.A. of Midland, Mich.

Methylcellulose forms a reversible gel when heated. The methylcellulose gels trap water in the product at high temperatures during microwave cooking, then releases the water back into the food during cooling. The other water absorbing ingredients including fibers and hydrocolloids hold water well at colder temperatures.

Functional Surfactant

Surfactants have been used in baked goods and breads for many reasons. Surfactants, such as monoglycerides, have been used to retard the rate of crumb firming and inhibit effects of staling, but they can also improve dough handling, loaf volume, and texture. Surfactants including SSL, PS 60, EMG, DATEM, SMG and natural polar lipids such as lethicins are often used to condition dough and strengthen the gluten network to improve mixing tolerance, gas retention, dough shock resistance. Surfactants also improve product quality in specialty breads containing nonglutinous ingredients by strengthening the gluten that is present. Polar lipids naturally present in flour also participate to some extent. Surfactants interact with starch as well as protein and have different functionalities. For example, DATEM is a better strengthening surfactant than SSL, which provides a better softening effect, while monoglycerides provide little strengthening and more softening. Blends of emulsifiers are often used to provide the optimal balance between dough strengthening and crumb softening to improve bread quality. (Knightly, W. H. 1996. Ch. 2 in Baked Goods Freshness, Marcel Dekker, Hebeda and Zobel eds.)

Food grade functional surfactants or emulsifiers act with other components in the dough composition to enhance dough quality. Known acceptable food grade or food additive functional surfactants or emulsifier materials include: acacia; acetylated hydrogenated coconut glycerides; acetylated hydrogenated cottonseed glyceride; acetylated hydrogenated soybean oil glyceride; acetylated lard glyceride; acetylated mono- and diglycerides of fatty acids; acetylated tartaric acid esters of mono- and diglycerides of fatty acids; acyl lactylates; agar; albumen; algin; alginic acid; aluminum caprylate; aluminum stearate; ammonium alginate; ammonium carrageenan; ammonium furcelleran; ammonium phosphate, dibasic; arabinogalactan; ascorbyl palmitate; Bakers yeast extract; bentonite calcium carrageenan; calcium citrate; calcium dihydrogen pyrophosphate; calcium furcelleran; calcium lactate; calcium phosphate monobasic monohydrate; calcium phosphate tribasic; calcium/sodium stearoyl lactylate; calcium stearate; calcium stearoyl lactylate; canola oil glyceride; capric triglyceride; caprylic/capric triglyceride; capryllic triglyceride; carrageenan; cellulose; cholesterol; cholic acid; coconut oil; corn glycerides; corn oil; cottonseed glyceride; cottonseed oil; Darner; diacetyl tartaric acid esters of mono- and diglycerides; disodium citrate; disodium phosphate, dihydrate; disodium pyrophosphate; Furcelleran; guar gum gum ghelti; hydrogenated cottonseed glyceride; hydrogenated lard glyceride; hydrogenated lard glycerides; hydrogenated palm glyceride; hydrogenated rapeseed oil; hydrogenated soybean glycerides; hydrogenated soy glyceride; hydrogenated tallow glyceride; hydrogenated tallow glyceride citrate; hydrogenated tallow glyceride lactate; hydrogenated tallow glycerides; hydrogenated vegetable glyceride; hydrogenated vegetable glycerides; hydrogenated vegetable oil; hydroxylated lecithin; hydroxypropylcellulose; hydroxypropyl methylcellulose; Karaya gum; lactic acid esters of mono- and diglycerides of fatty acids; lactylic esters of fatty acids; lard; lard glyceride; lard glycerides; lecithin; Locust bean gum; magnesium stearate; methylcellulose; methyl ethyl cellulose; mono- and diglycerides of fatty acids; mono- and diglycerides, sodium phosphate derives; octenyl succinic anhydride; Oleth-23; palm glyceride; palm oil; palm oil sucroglyceride; peanut glycerides; peanut oil; pea protein concentrate; Pectin; PEG-20 dilaurate; PEG-7 glyceryl cocoate; PEG-20 glyceryl stearate; PEG-40 sorbitan hexataliate; PEG-20 sorbitan tritaliate; PEG-6 stearate; PEG-8 stearate; PEG-40 stearate; pentapotassium triphosphate; phosphatidylcholine; polyglyceryl-10 decasterate; polyglyceryl-10 decastearate; polyglyceryl-2 dilsostearate; polyglyceryl-3 dilsostearate; polyglyceryl-5 dilsostearate; polyglyceryl-3 dioleate; polyglyceryl-6 dioleate; polyglyceryl-10 dioleate; polyglyceryl-10 dipalmitate; polyglyceryl-2 distearate; polyglyceryl-3 distearate; polyglyceryl-5 distearate; polyglyceryl-6 distearate; polyglyceryl-10 distearate; polyglyceryl-8 hexaoleate; polyglyceryl-10 hexaoleate; polyglyceryl-10 isostearate; polyglycaryl-10 laurate; polyglyceryl-10 linoleate; polyglyceryl-10 myristate; polyglyceryl-2 oleate; polyglyceryl-3 oleate; polyglyceryl-4 oleate; polyglyceryl-6 oleate; polyglyceryl-8 oleate; polyglyceryl-4 pentaoleate; polyglyceryl-10 pentaoleate; polyglyceryl-4 pentastearate; polyglyceryl polyyricinoleate; polyglyceryl-2 sesquioleate; polyglyceryl-2 stearate; polyglyceryl-3 stearate; polyglyceryl-4 stearate; polyglyceryl-8 stearate; polyglyceryl-10 stearate; polyglyceryl-10 tetraoleate; polyglyceryl-2 tetrastearate; polyglyceryl-2 trisosterate; polyglyceryl-4 tristearate; Polysorbate 20; Polysorbate 21, potassium alginate; potassium citrate; potassium furcelleran; potassium oleate; potassium phosphate dibasic; potassium phosphate tribasic; potassium polymetaphosphate; potassium sodium tartrate anhydride; potassium sodium tartrate tetrahydrate; potassium tripolyphosphate; propylane glycol; propylene glycol alginate; propylene glycol dicaprylate/dicaprate; propylene glycol esters of fatty acids; propylene glycol laurate; propylene glycol laurate SE; propylane glycol monodistearate; propylene glycol oleate; propylene glycol oleate SE; propylene glycol palmitate; propylene glycol ricinoleate; propylene glycol ricinoleate SE; propylene glycol ricinoleate SE; propylene glycol stearate; propylene glycol stearate SE; rapeseed oil glyceride; saccharose distearate; saccharose mono/distearate; saccharose palmitate; safflower glyceride; safflower oil; sodium acid pyrophosphate; sodium aluminum phosphate acid; sodium aluminum phosphate, basic; sodium carrageenan; sodium caseinate; sodium furcellaran; sodium hexametaphosphate; sodium hypophosphite; sodium laurate; sodium lauryl sulfate; sodium metaphosphate; sodium phosphate dibasic; sodium phosphate tribasic; sodium phosphate tribasic dodecahydrate; sodium stearate; sodium stearoyl lactylate; sodium tartrate; sorbitan caprylate; sorbitan myristate; sorbitan palmitate; sorbitan sesquioleate; sorbitan sesquistearate; sorbitan stearate; sorbitan trioleate; sorbitan tristearate; sorbitan tritallate; soybean oil; soy protein; Steareth-20; stearyl-2-lactyle acid; succinylated monoglycerides; succistearin; sucrose dilaurata; sucrose distearate; sucrose erucate; sucrose fatty acid esters; sucrose laurate; sucrose myristate; sucrose oleate; sucrose palmitate; sucrose polylaurate; sucrose polylinoleate; sucrose polyoleate; sucrose polystearate; sucrose stearate; sucrose tetrastearate triacetate; sucrose tribehenete; sucrose tristerate; sunflower seed oil; sunflower seed oil glyceride; sunflower seed oil glycerides; superglycerinated hydrogenated rapeseed oil; Tallow glyceride; tallow glycerides; tartaric acid esters of mono- and diglycerides, tetrapotassium pyrophosphate; tetrasodium pyrophosphate; Tragacanth gum; triaodium citrate; xanthan gum.

More preferred functional surfactants or emulsifiers which may be utilized include monoglycerides, diglycerides and mixed monodiglycerides. These emulsifiers comprise fatty acid esters of glycerol in which the glycerol is substituted with one or two fatty acid moieties or mixed materials thereof. Common monoglycerides, diglycerides or mixed monoglycerides and diglycerides include the following: glyceryl caprate; glyceryl caprylate/caprate; glyceryl citrate/lactate/linoleate/oleate; glyceryl cocoate; glyceryl cottonseed oil; glyceryl dioleate; glyceryl dioleste SE; glyceryl disterate; glyceryl distearate SE; glyceryl d/tribehenate; glyceryl lactoesters; glyceryl lactoeleate; glyceryl lactopalmitate/stearate; glyceryl laurate; glyceryl laurate SE; glyceryl linoleate; glyceryl mono/dilaurate; glyceryl mono/dioleate; glyceryl mono/distearate; glyceryl mono/distearate-palmitate; glyceryl oleate; glyceryl oleate SE; glyceryl palmitate; glyceryl palmitate lactate; glyceryl palmitate stearate; glyceryl ricinoleate; glyceryl ricinoleate SE; glyceryl soyate; glyceryl stearate; glyceryl stearate citrate; glyceryl state lactate; glyceryl stearate SE, and mixtures thereof.

The following examples illustrate the invention and are intended to further describe and not to limit the invention. All percentages used herein are by weight, unless otherwise indicated.

EXAMPLE 1

Comparative Formulations

Doughs were prepared to evaluate the importance of fiber, hydrocolloid, methylcellulose and surfactant in dough compositions. The dough formulas can be summarized as follows. Symbols (+ or −) refer to relative amounts.

| Ingredients | IP1 | D1 | D2 | P3 | S4 | S5 | BR1 |
|---|---|---|---|---|---|---|---|
| Egg Protein | − | − | − | − | − | − | ++ |
| Fiber | − | + | + | − | ++ | ++ | − |
| Hydrocolloid | − | + | + | − | +++ | + | − |
| Methylcellulose | − | + | ++ | − | + | − | + |
| Emulsifier | + | ++ | +++ | +++ | ++ | ++ | − |

The following compositions where prepared.

| Ingredients | IP1 (wt %) | D1 (wt %) | D2 (wt %) | P3 (wt %) | S4 (wt %) | S5 (wt %) | BR1 (wt %) |
|---|---|---|---|---|---|---|---|
| Hard Wheat Flour | 59.27 | 53.20 | 52.92 | 58.58 | 55.04 | 59.15 | 55.33 |
| Flour Carrier (Improver blend) | | | | | | | 3.04 |
| White Corn Meal | | 2.13 | 2.12 | | | | |
| Gluten | | 0.53 | 0.53 | | | | |
| Dried Egg white (Improver blend) | | | | | | | 0.83 |
| Compressed yeast | 2.37 | 1.46 | 1.46 | 2.34 | 1.98 | 2.13 | 2.21 |
| Sodium Aluminum Phosphate | 0.30 | 0.27 | 0.26 | 0.29 | | | 0.28 |
| Encapsulated Sodium Bicarbonate | 0.43 | 0.38 | 0.38 | 0.42 | 0.55 | | 0.40 |
| Double Acting Baking Powder | | | | | 1.10 | | |
| Salt | 0.89 | 0.66 | 0.66 | 0.88 | 1.10 | 1.18 | 0.83 |
| Sucrose | 3.56 | 4.26 | 4.23 | 3.51 | | 1.18 | 3.32 |
| High Fructose Corn Syrup | | | | | 3.47 | | |
| Emulsified baking shortening | 3.56 | 1.06 | 1.06 | 3.51 | 1.32 | 1.42 | |
| Non emulsified shortening (Improver blend) | | | | | | | 4.15 |
| Soybean Oil | | 3.72 | 3.70 | | | | |
| Shortening Flakes | | 3.19 | 3.17 | | | | |
| Pastry flakes (light, 40% N2) | | | | | 1.98 | | |
| Ultracel | | 0.27 | 0.26 | | | | |
| SolkaFloc | | | | | 0.55 | 0.59 | |
| Rice bran extract | | 0.27 | 0.26 | | | | |
| Gum Blend (starch, guar, xanthan) | | | | | 0.55 | | |
| Methocel A15 | | 0.27 | 0.53 | | | | |
| Hydroxy Propyl Methyl Cellulose | | | | | 0.33 | | |
| Methylcellulose E461 (Improver blend) | | | | | | | 0.28 |
| Sodium Stearoyl Lactylate | | 0.27 | 0.26 | 1.17 | | | |
| Diacetyl Esters of Monoglycerides | | 0.27 | 0.26 | | 0.06 | | |
| mono and di-glycerides (64K, Amer. Ing.) | | 0.27 | 0.26 | | | | |
| Lecithin | | 0.27 | 0.53 | | | | |
| Opti-Frost (dough conditioner, Uldo) | | | | | 1.10 | 1.18 | |
| L-Cysteine + Whey (dough conditioner) | | | | | 0.04 | 0.04 | |
| Ascorbic Acid | | 0.01 | 0.01 | | | | |
| Artificial flavor | | 0.40 | 0.40 | | | | |
| Cold Water | 29.63 | 26.86 | 26.72 | 29.29 | 30.82 | 33.12 | 29.33 |
| Total | 100.00 | 100.00 | 100.00 | 100.00 | 100.00 | 100.00 | 100.00 |

The above-described formulas were prepared in two separate batches on two separate days. Dough was prepared as follows:
1. Dry ingredients were combined in a Hobart mixing bowl at room temperature (~70° F.).
2. The remaining ingredients (lipids, yeast, cold water, flavor, acidulents) are added to the dry ingredients.
3. Mixing was conducted at 1 minute at speed 1 followed by 8 minutes at speed 2. The dough temperature during mixing ranges from 70-80° F.
4. The dough was proofed for 30 minutes at 105° F. and 85% relative humidity.
5. The dough was shaped by hot pressing.
6. The crust was blast frozen at −30° F.

Pizzas were prepared as follows:

| Component | Formula Weight (g) |
|---|---|
| Crust | 168 |
| Pizza sauce | 55 |
| Dry cheese blend | 2.3 |
| Grated Mozzarella cheese | 60 |

Pizza topping directions:
1. Weigh crust. Record weight in grams.
2. Place sauce in center of crust and spread evenly out to the rim of crust.
3. Sprinkle evenly with dry cheese blend on sauce.
4. Apply Mozzarella cheese on all ingredients (do not cover rim).

Pizza Packaging
1. Topped pizza is blast frozen at −30° F. and placed on top of a cardboard circle.
2. The pizza and cardboard circle are placed in a plastic bag and vacuum sealed.
3. Packaged pizza was placed in freezer at −10° F.

Storage of Pizzas

Packaged pizzas are stored under a temperature cycling protocol, which simulates commercial retail freezers in terms of repeated freezing and thawing. The pizzas are removed from −10° F. storage before being placed in a temperature cycling chamber. The temperature chamber cycles between 0° F. and 25° F. for 112 cycles over a two week period of time.

Baking and Sensory Testing

Sensory tests were conducted the pizzas after the two week storage period described above. Samples were heated in an 1100 watt microwave oven for 4 minutes and 45 seconds. Samples were evaluated by a trained expert panel and rated on a rating scale of 0 to 9 for crust rise, crispness, dryness and chewiness. Samples were randomized and tasted on a blind basis.

Texture Testing

Three (3) cycled samples of each pizza type were tested using a TA-XT2 Texture Analyzer (Stable Micro Systems, Ltd. Surrey, UK). A penetration test was performed using a 2 mm flat-bottomed probe.

After microwaving as described above, the pizza is allowed to sit for 15 minutes at room temperature (~70° F.) in an enclosed chamber. Up to eight measurements are taken at spaced increments along the pizza rim. The maximum force required to puncture completely through the entire rim of the crust (both top and bottom crust layers) is recorded as peak force in gm-force.

Statistical Analysis of Firmness Data

The graph in FIG. 1 shows the distribution of firmness measurements by formula. The different symbols indicate measurements on pizzas made on 2 different production days.

Firmness measurements were analyzed using a two-way analysis of variance model. This model has terms for the effects of formula, date made, and the interaction of formula and date made. The effect tests table indicates the level of significance for the tests of these effects in the column labeled Prob>F. Using an alpha=5% significance level, values smaller than 0.05 correspond to effects that are significant. Only the formula effect is significant for the firmness data—there are no differences overall in production date, and the formula differences are consistent across the production dates. This is also evident in the graph, since the symbols representing the production days are interspersed within the distributions.

Figure 3:
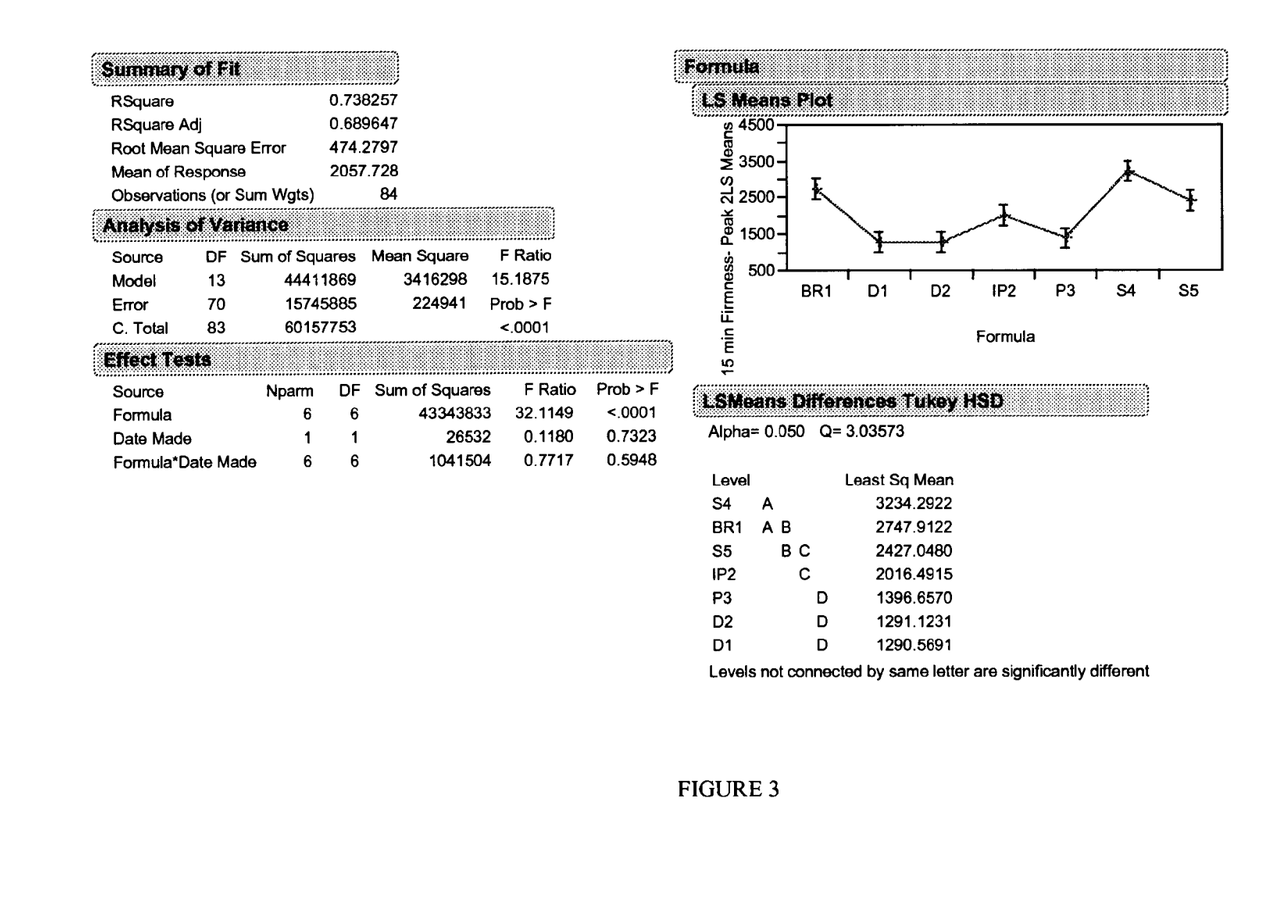
FIG. 3 includes an assessment of individual formula differences using Tukey's HSD mean comparison procedure.

As shown in FIG. 3, individual formula differences were assessed using Tukey's HSD mean comparison procedure. This procedure controls the overall experimentwise error rate for the set of all possible pairs of means. The table in FIG. 3 lists the formula means in descending order, with means not connected by the same letter significantly different at the 5% significance level. Examination of the table indicates that the D1, D2 and P3 formulas significantly less in firmness than all other formulas.

EXAMPLE 2

Par-Baked Flatbread Formula

| Ingredient | Wgt % |
|---|---|
| Hard wheat flour | 56.92 |
| Salt | 0.85 |
| Double Acting Baking Powder | 0.57 |
| Diacetyl Esters of Monoglycerides | 0.57 |
| L-cysteine + whey (dough conditioner) | 0.34 |
| DATEM | 0.28 |
| Lecithin | 0.28 |
| Ultracel | 0.28 |
| Compressed Yeast | 2.28 |
| Soybean Oil | 8.54 |
| Flavor | 0.17 |
| Guar Gum | 0.17 |
| Cold Water | 28.46 |
| Total | 100.00% |

Procedure: In 20 qt Hobart mixer, add dry ingredients and hand mix. Add lipids, yeast and water. Mix to optimal dough development (about 4 mins at speed 1, followed by 5 mins at speed 2). Let dough rest, divide and proof for 10 mins at 105° F. and 85% RH. Form dough, dock and bake at 450° F. for approximately 2 mins, until baked.

All references cited in the present specification are incorporated by reference.

What is claimed is:

1. A microwavable dough product comprising:
    about 0.05 weight percent to about 20 weight percent methylcellulose, based on the weight of the dough;
    about 0.05 weight percent to about 20 weight percent fiber, based on the weight of the dough;
    about 0.05 to about 20 weight percent functional surfactant, based upon the weight of the dough; and
    about 0.01 to about 5 weight percent hydrocolloid, based upon the weight of the dough, the fiber having a water holding capacity of at least about 100 percent and the methylcellulose, fiber, functional surfactant and hydrocolloid being present in relative amounts effective to provide a microwaved baked bread product with a penetration firmness of 2000 grams of force or less at 15 minutes after microwaving the dough.

2. The microwavable dough of claim 1 wherein the fiber has a water holding capacity of more than 100%.

3. The microwavable dough of claim 1 wherein the fiber is a dietary fiber selected from the group consisting of grain-based fiber, cellulosic fiber, leguminous fiber, fruit fiber, vegetable fiber and mixtures thereof.

4. The microwavable dough of claim 1 wherein the dough includes from 0.05 weight percent to 2.5 weight percent hydrocolloid, based on the weight of the dough.

5. The microwavable dough of claim 1 wherein the hydrocolloid is selected from the group consisting of ionic gums, neutral gums, modified starches, and mixtures thereof.

6. The microwavable dough of claim 1 wherein the dough includes from about 0.1 weight percent to about 10 weight percent methylcellulose, based on the weight of the dough.

7. The microwavable dough of claim 1 wherein the methylcellulose has a viscosity of 10 to 10,000 mPa-s.

8. The microwavable dough of claim 1 wherein the methylcellulose has an activation temperature of 90 F. to 200 F.

9. The microwavable dough of claim 1 wherein the methylcellulose is selected from the group consisting of methylcellulose, hydroxypropylmethylcellulose, carboxymethylcellulose, ethylcellulose, and mixtures thereof.

10. The microwavable dough of claim 1 wherein the dough includes from about 0.1 weight percent to 10 weight percent functional surfactant, based on the weight of the dough.

11. The microwavable dough of claim 1 wherein the functional surfactant is selected from the group consisting of SSL, CSL, DATEM, monoglycerides, mono and diglycerides, ethoxylated monoglycerides, succinylated monoglycerides, polysorbate emulsifiers, sucrose esters, lecithin, modified lecithins, and mixtures thereof.

12. A method for cooking a product in a microwave oven, the method comprising microwaving a dough from frozen to provide a cooked product, the dough including about 0.05 weight percent to about 20 weight percent fiber, based upon the weight of the dough, having a water holding capacity of at least about 100 percent, about 0.01 to about 5 weight percent hydrocolloid, based upon the weight of the dough, about 0.05 weight percent to about 20 weight percent methylcellulose, based upon the weight of the dough, and about 0.05 weight percent to about 20 weight percent functional surfactant, based upon the weight of the dough, the methylcellulose fiber, functional surfactant and hydrocolloid being in relative amounts to provide a cooked dough having a firmness of 2000 grams of force or less at 15 minutes after microwaving.

13. The method of claim 12 wherein the dough includes from 0.1 weight percent to 10 weight percent fiber, based on the weight of the dough.

14. The method of claim 12 wherein the fiber has a water holding capacity of more than 100%.

15. The method of claim 12 wherein the fiber is a dietary fiber selected from the group consisting of grain-based fiber, cellulosic fiber, leguminous fiber, fruit fiber, vegetable fiber and mixtures thereof.

16. The method of claim 12 wherein the dough includes from 0.05 weight percent to 2.5 weight percent hydrocolloid, based on the weight of the dough.

17. The method of claim 12 wherein the hydrocolloid is selected from the group consisting of ionic gums, neutral gums, modified starches, and mixtures thereof.

18. The method of claim 12 wherein the dough includes from about 0.1 weight percent to about 10 weight percent methylcellulose, based on the weight of the dough.

19. The method of claim 12 wherein the methylcellulose has a viscosity of 10 to 10,000 mPa-s.

20. The method of claim 12 wherein the methylcellulose has an activation temperature of 90 F. to 200 F.

21. The method of claim 12 wherein the methylcellulose is selected from the group consisting of methylcellulose, hydroxypropylmethylcellulose, carboxymethylcellulose, ethylcellulose, and mixtures thereof.

22. The method of claim 12 wherein the dough includes from about 0.1 weight percent to 10 weight percent functional surfactant, based on the weight of the dough.

23. The method of claim 12 wherein the functional surfactant is selected from the group consisting of SSL, CSL, DATEM, monoglycerides, mono and diglycerides, ethoxylated monoglycerides, succinylated monoglycerides, polysorbate emulsifiers, sucrose esters, lecithin, modified lecithins, and mixtures thereof.

24. A method for producing a microwaveable dough product comprising:
blending fiber, methylcellulose, functional surfactant, hydrocolloid and water to form a dough blend, the methylcellulose forming from about 0.05 to about 20 weight percent of the dough, the fiber comprising from about 0.05 to about 20 weight percent of the dough, the functional surfactant comprising from about 0.05 to about 20 weight percent of the dough, and the hydrocolloid comprising from about 0.1 to about 5 weight percent of the dough, and the fiber having a water holding capacity of at least about 100 percent;
forming a dough from the dough blend, the fiber, hydrocolloid, methylcellulose, and functional surfactant in relative amounts effective to provide a microwaved cooked bread product having a firmness of 2000 grams of force or less at 15 minutes after microwaving.

25. The method of claim 24 wherein the hydrocolloid is selected from the group consisting of polyvinyl pyrrolidone, carbopols, ethylene oxide polymers, arabic gum, karaya gum, tragacanth gum, agar, alginates, carrageenans, furcellarines, arabino galactanes, guar gum, locust bean gum, psyllium seed gum, tamarind seed gum, xanthan gum and mixtures thereof.

26. The microwavable dough of claim 1 wherein the hydrocolloid is selected from the group consisting of polyvinyl pyrrolidone, carbopols, ethylene oxide polymers, arabic gum, karaya gum, tragacanth gum, agar, alginates, carrageenans, furcellarines, arabino galactanes, guar gum, locust bean gum, psyllium seed gum, tamarind seed gum, xanthan gum and mixtures thereof.

27. The method of claim 12 wherein the hydrocolloid is selected from the group consisting of polyvinyl pyrrolidone, carbopols, ethylene oxide polymers, arabic gum, karaya gum, tragacanth gum, agar, alginates, carrageenans, furcellarines, arabino galactanes, guar gum, locust bean gum, psyllium seed gum, tamarind seed gum, xanthan gum and mixtures thereof.

28. A microwavable dough product comprising:
about 0.05 weight percent to about 20 weight percent methylcellulose, based on the weight of the dough;
about 0.2 weight percent to about 5 weight percent fiber, based on the weight of the dough;
about 0.2 to about 5 weight percent functional surfactant, based upon the weight of the dough; and
about 0.01 to about 5 weight percent hydrocolloid, based upon the weight of the dough, the fiber having a water holding capacity of at least about 100 percent and the methylcellulose, fiber, functional surfactant and hydrocolloid being present in relative amounts effective to provide a microwaved baked bread product with a penetration firmness of 2000 grams of force or less at 15 minutes after microwaving the dough.

29. A method for producing a microwaved product with a dough that includes about 0.2 weight percent to about 5 weight percent fiber, based upon the weight of the dough, having a water holding capacity of at least about 100 percent, about 0.01 to about 5 weight percent hydrocolloid, based upon the weight of the dough, about 0.2 weight percent to about 5 weight percent methylcellulose, based upon the weight of the dough, and about 0.2 weight percent to about 5 weight percent functional surfactant, based upon the weight of the dough, the methylcellulose fiber, functional surfactant and hydrocolloid being in relative amounts to provide a cooked dough having a firmness of 2000 grams of force or less at 15 minutes after microwaving, the method comprising microwaving the dough to provide the microwaved cooked product.

* * * * *